US 7,122,740 B2

(12) United States Patent
Xu et al.

(10) Patent No.: US 7,122,740 B2
(45) Date of Patent: Oct. 17, 2006

(54) SCREWLESS SWITCH PLATE ASSEMBLY

(76) Inventors: Shaojie Xu, 8808 W. 125th St., Overland Park, KS (US) 66213; Hui Xu, Rm. #401, Building #8, No. 768 Gongping Road (Dongfangdushi), Shanghai, Shanghai (CN) 200086

( * ) Notice: Subject to any disclaimer, the term of this patent is extended or adjusted under 35 U.S.C. 154(b) by 0 days.

(21) Appl. No.: 10/990,674

(22) Filed: Nov. 18, 2004

(65) Prior Publication Data

US 2005/0257951 A1    Nov. 24, 2005

(30) Foreign Application Priority Data

May 20, 2004    (CN)    .................. 2004 2 0229489

(51) Int. Cl.
*H02G 3/14*    (2006.01)
(52) U.S. Cl. ................ 174/66; 174/67; 220/241
(58) Field of Classification Search ................ 174/66, 174/67; 220/241, 242
See application file for complete search history.

(56) References Cited

U.S. PATENT DOCUMENTS

| 3,953,933 A | 5/1976 | Goldstein |
| 4,631,354 A | 12/1986 | Boteler |
| 4,800,239 A | 1/1989 | Hill |
| 4,835,343 A * | 5/1989 | Graef et al. .................. 174/66 |
| 5,073,681 A | 12/1991 | Hubben et al. |
| D327,212 S | 6/1992 | Hubben et al. |
| 5,153,816 A | 10/1992 | Griffin |
| 5,180,886 A | 1/1993 | Dierenbach et al. |
| 5,189,259 A | 2/1993 | Carson et al. |
| 5,456,373 A | 10/1995 | Ford |
| 5,675,125 A | 10/1997 | Hollinger |
| 5,723,817 A | 3/1998 | Arenas et al. |
| 6,218,617 B1 | 4/2001 | Estanislao et al. |
| 6,281,440 B1 | 8/2001 | Baldwin et al. |
| D461,113 S | 8/2002 | Aubert Capella |
| D465,114 S | 11/2002 | Lai |
| D473,528 S | 4/2003 | Wengrower |
| D484,392 S | 12/2003 | Mayo et al. |
| 6,679,725 B1 | 1/2004 | Kidman |

* cited by examiner

*Primary Examiner*—Dhiru R. Patel
(74) *Attorney, Agent, or Firm*—Chase Law Firm, L.C.

(57) ABSTRACT

A thin switch plate assembly for covering and mounting switches includes of a face plate attached to a base plate by a snap-fit connection to provide a screwless appearance.

4 Claims, 7 Drawing Sheets

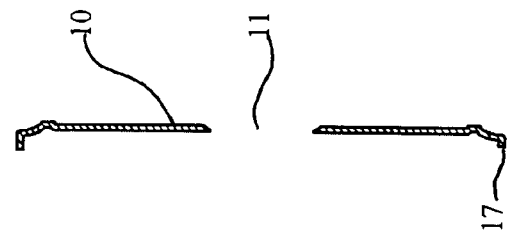
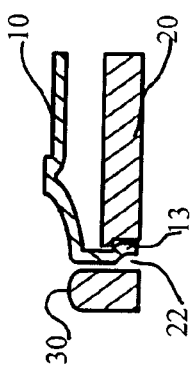
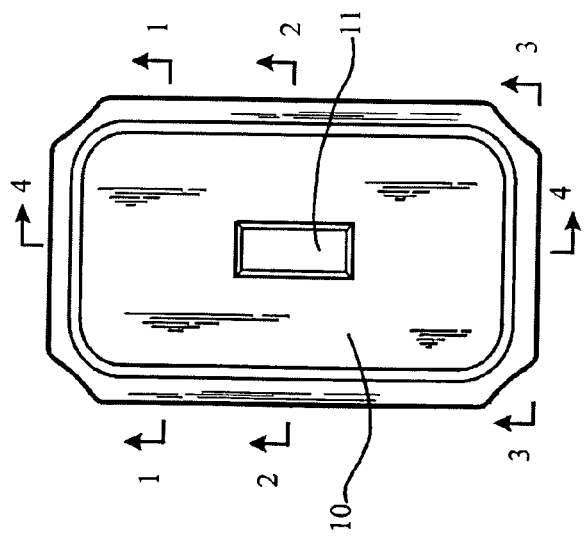
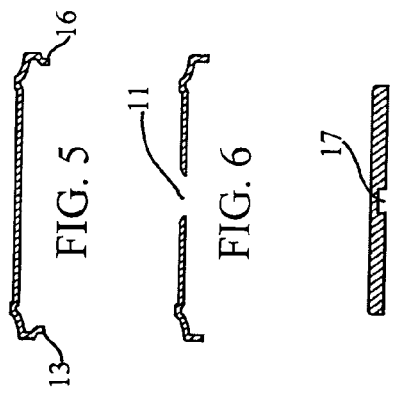
FIG. 4
FIG. 5
FIG. 6
FIG. 7
FIG. 8
FIG. 9

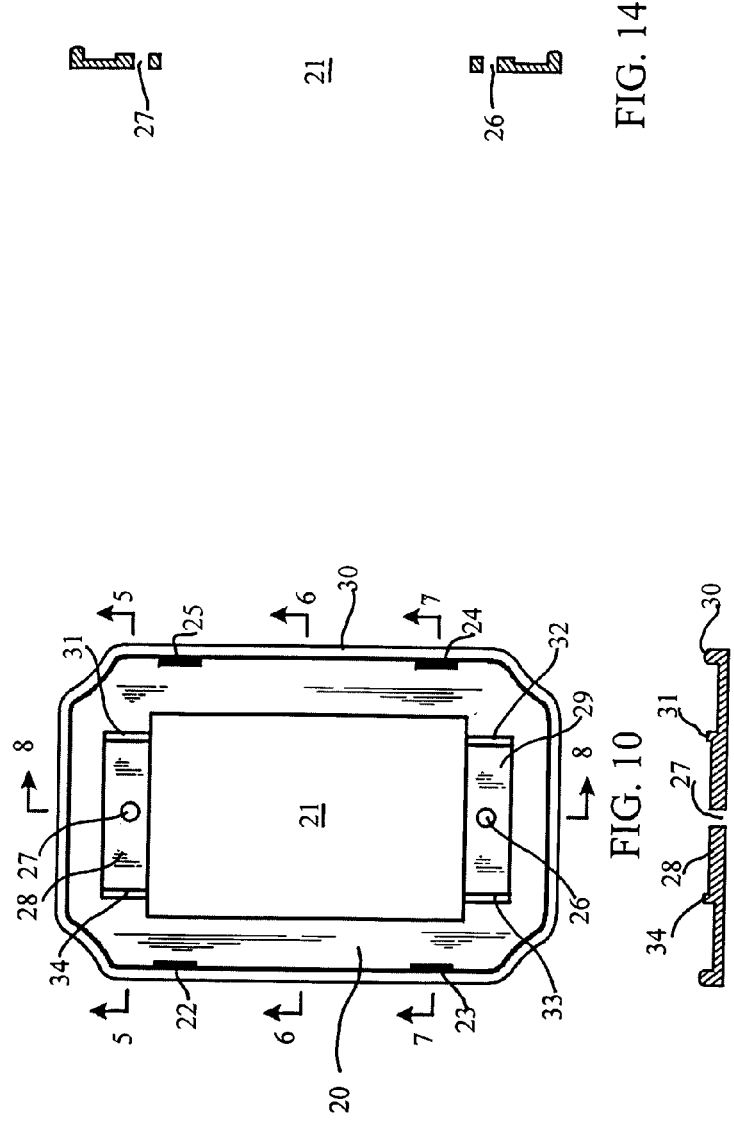
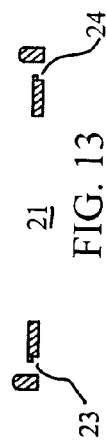
FIG. 14
FIG. 10
FIG. 11
FIG. 12
FIG. 13

SCREWLESS SWITCH PLATE ASSEMBLY

CROSS-REFERENCE TO RELATED APPLICATIONS

This application claims the benefit of utility patent application Ser. No. 2004200229489, filed 2004 May 20th in China by the present inventor. In addition, this application is related to and claims the benefit of the prior filed, co-pending non-provisional application. Ser. No. 10/910,122, filed Aug. 4, 2004.

FEDERALLY SPONSORED RESEARCH

Not Applicable

SEQUENCE LISTING OR PROGRAM

Not Applicable

BACKGROUND OF THE INVENTION

1. Field of Invention

This invention relates to a novel switch plate assembly used to provide support, enclosure and decorative functions for wall switches, receptacles and the like.

2. Prior Art

Most home owners do not like switch plates having mounting screws visible, especially switch plates made of metal with decorative surface treatments. However, conventional metal switch plates are made with visible screws. One example of such plates is stated in U.S. Pat. No. US D465,144 S.

Due to the structural limitation of conventional switch plate assemblies having with snap fit connections, components of such assemblies are commonly made of plastic to hide mounting screws. This is because metal connectors of such assemblies are subject to breaking at installation or replacement. All conventional switch plate assemblies are either made of non-metallic materials to hide mounting screws or made of metal with exposed mounting screws on front surfaces.

In fact, metal switch plates are superior to plastic ones in terms of durability and application of surface treatment and appearance.

A suitable structure providing a screwless switch plate assembly made of metal and capable of easy replacement is not solved by prior art devices.

OBJECTS AND ADVANTAGES

Accordingly, a principal object of the present invention is to solve the above-mentioned problems and to provide a novel switch plate assembly comprising a face plate and a base plate to hide mounting screws on the front surface.

Another object of the present invention is to provide a base plate that will accommodate a face plate either molded or made of steel plate so that various decorative styles can be selected by choosing different colors and surface treatments for the face plate and base plate.

Another object of the present invention is to provide a switch plate assembly having improved means for snap fit connection, thus reducing the possibility of breaking at replacement.

Another object of the present invention is to provide a base plate as a support platform for switches to maintain alignment of the switch against the wall and to receive a face plate.

Another object of the present invention is to provide a thin switch plate assembly with a pleasing decorative appearance.

A related object of the present invention is to employ a punch press to fabricate the face plates from steel plate to enable high productivity for a manufacturer.

Yet another object of the present invention is to provide demounting holes along the short side of the face plate for easy replacement of the assembly.

Another object of the present invention is to provide a base plate with a central large opening adapted not only for receiving at least one switch but also for passage of switches carrying connected wires moved from the back side of the base plate to the front side for replacement of a conventional switch plate assembly.

SUMMARY

A screwless switch plate assembly comprises a base plate and a face plate. The face plate is snapped into the base plate by a snap fit connection. The base plate accommodates switches and is mounted onto a wall box together with the switch by the same screws at the same time.

BRIEF DESCRIPTION OF THE DRAWINGS

FIG. 4 is a front elevation view of the face plate shown in FIG. 1;

FIG. 5 is a sectional view of the face plate shown in FIG. 4 taken along the line 1—1;

FIG. 6 is a sectional view of the face plate shown in FIG. 4 taken along the line 2—2;

FIG. 7 is a sectional view of the face plate shown in FIG. 4 taken along the line 3—3;

FIG. 8 is a sectional view of the face plate shown in FIG. 4 taken along the line 4—4;

FIG. 9 is a sectional view of the snap-fit connection showing the snap bent from steel plate inwardly projected to interlock with the base plate;

FIG. 10 is an elevation view of the base plate shown in FIG. 1;

FIG. 11 is a sectional view of the base plate shown in FIG. 10 taken along the line 5—5;

FIG. 12 is a sectional view of the base plate shown in FIG. 10 taken along the line 6—6;

FIG. 13 is a sectional view of the base plate shown in FIG. 10 taken along the line 7—7;

FIG. 14 is a sectional view of the base plate shown in FIG. 10 taken along the line 8—8;

DRAWINGS

Figure 1:
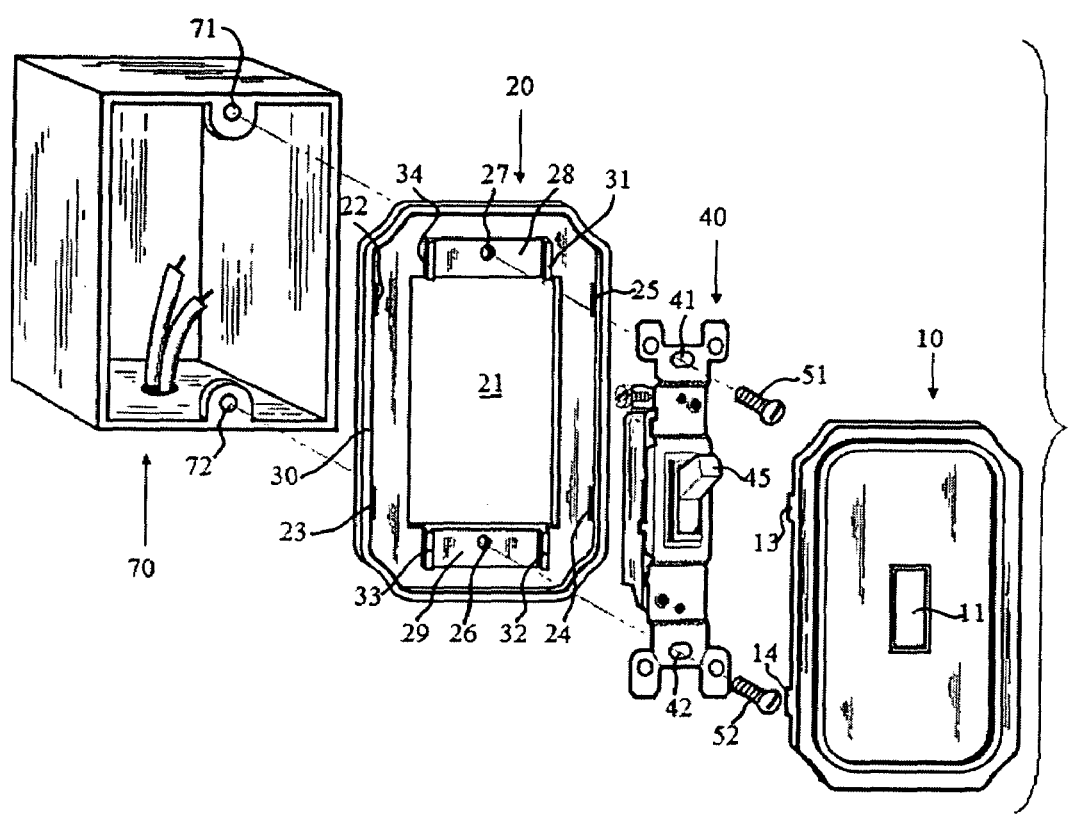
FIG. 1 is an exploded perspective view of a preferred embodiment of the present invention for a toggle switch.

Reference Numerals 10 steel face plate
11 opening
13, 14, 15 and 16 snap bent from steel plate
17 prying hole
20 base plate
21 opening
26 and 27 screw hole
22, 23, 24 and 25 snap receiving notch
28 and 29 housing surface
30 edge strip
31, 32, 33 and 34 switch housing retainer strips
40 switch
41 and 42 screw hole
45 switch actuator
51 and 52 screw
70 wall box
71 and 72 screw hole
100 molded face plate
130, 140, 150 and 160 molded snap
200, 201, 202 and 203 alternative snap receiving notch
300, 301, 302 and 303 alternative molded snap

DESCRIPTION OF PREFERED EMBODIMENTS

The present invention will be described in detail by reference to the drawings. The drawings are for illustration and are not intended to limit the scope of the invention.

Referring first to FIG. 1, an exploded perspective view of the switch plate assembly of this invention for a toggle switch is shown. Switch 40 is mounted onto wall box 70 between the face plate 10 and base plate 20. Base plate 20 has a large central rectangular opening 21 adapted for receiving switch device 40. Opening 21 is also adapted to permit for retrofitting the new switch plate assembly over an existing switch without disconnecting wires. Base plate 20 is sized to cover the wall opening used for a standard wall box for switches such that the edge of the base plate will be supported against the wall. The switch plate assembly of the present invention can also be adapted for multiple switches. The inner periphery of base plate edge strip 30 is slightly larger than the outer periphery of face plate 10 so that base plate 20 can receive face plate 10. The raised base plate edge strip 30 can be extended outwards to form various ornamental shapes.

Switch 40 and base plate 20 are mounted to wall box 70 by the same screws 51 and 52. Screws 51 and 52 pass through screw holes 41 and 42 at switch 40 and screw holes 27 and 26 at base plate 20, respectively, and are threaded into screw holes 71 and 72 of wall box 70 to fasten both switch 40 and base plate 20 to wall box 70 at the same time. As can be seen, the novel assembly is not supported by the switch and is fastened directly to the wall box 70. This is different from a conventional switch plate which is mounted on switches. The base plate of the present invention is mounted onto the wall box, instead of the switch, with its back flush against the wall. Therefore, the assembly does not need any support means from switches. Accordingly, the assembly is an independent structure. The base plate mounted on the wall box functions as a stable platform to receive the face plate. Screw holes 41 and 42 provided with switches are standard spaced, which match those provided with wall box 70 according to industry standards. The base plate screw holes are spaced similarly to match.

The base plate screw holes do not have to have standard spacing if the principle of this invention is adapted for other purposes such as for door lock covers and wall-mounted metal pictures. Shims provided with mounting screws generally provided with switches by switch manufacturers are not required for the installation of this invention. Shims can be discarded.

Snap receiving notches 22, 23, 24 and 25 are symmetrically located within base plate 20 and are aligned with corresponding snaps 13, 14, 15 and 16 (FIG. 2) extending from the periphery of face plate 10 for interlocking engagement. Face plate 10 has opening 11 which is adapted to permit actuator 45 of switch 40 to extend through face plate 10.

Face plate 10 is made from steel plate with projecting snaps for attachment to the base plate. Base plate 20 that accommodates face plate 10 is molded. Snaps bent from steel plate are not subject to breaking. The vertical lines and planes of the components of base plate 20 are all straight for easy molding of metal or plastic.

Face plate 10 shown in FIG. 2, FIG. 4, FIG. 5, FIG. 6, FIG. 7 and FIG. 8 for illustration of the assembly of this invention is made of steel plate. The thickness of steel face plate 10 is 0.8 mm at this preferred embodiment. The inwardly projecting snap bent from steel plate for snap-fit interlocking engagement with base plate 20 is shown in FIG. 9

Figure 2:
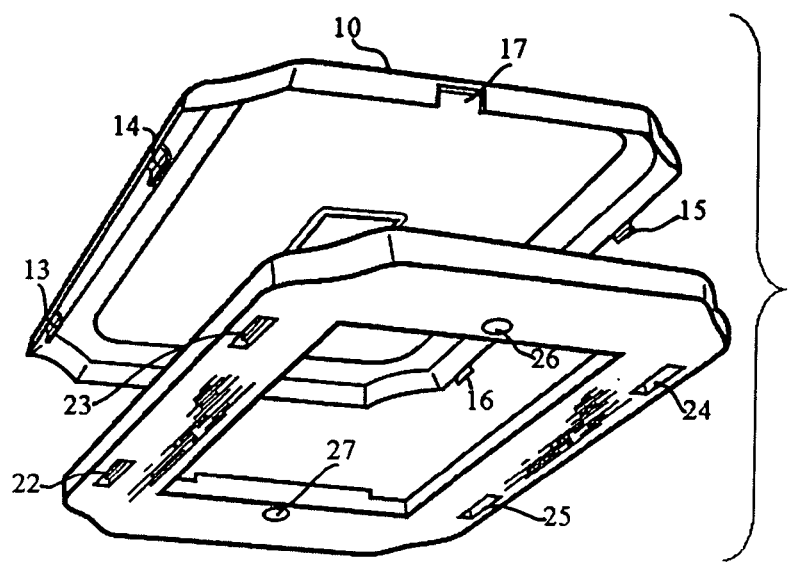
FIG. 2 is a perspective view of the face plate and the base plate, showing the back side of the base plate and face plate including the snaps bent from steel plate.

FIG. 2 is a perspective view of the face plate and base plate, showing the back side of the face plate and base plate including the projecting snaps bent from steel plate.

Figure 3:
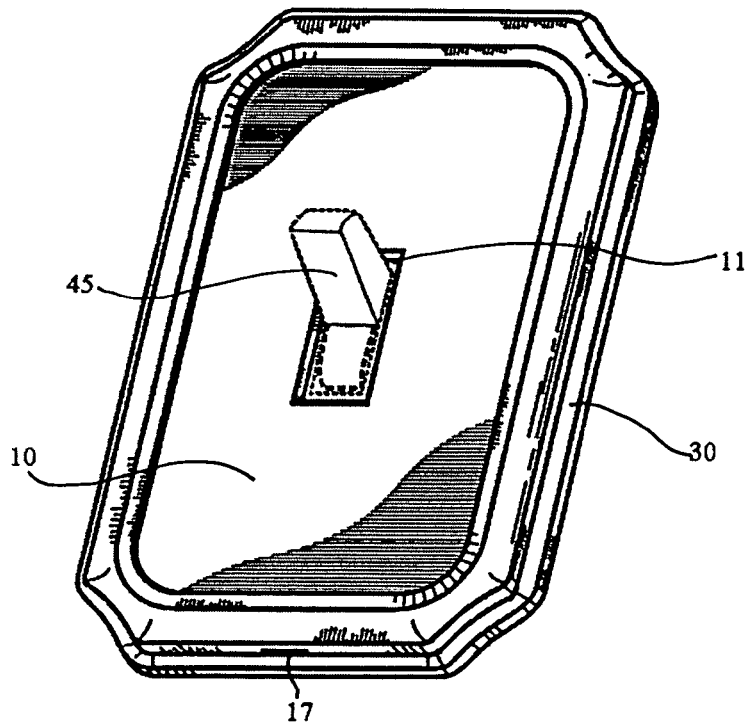
FIG. 3 is a perspective view of an installed switch plate assembly of the present invention.

FIG. 3 illustrates an installed switch plate assembly of this invention for a toggle switch. Face plate 10 is simply pressed into base plate 20 for snap-fit interlocking engagement.

FIG. 4 is a front elevation view of face plate 10 shown in FIG. 1. FIG. 5, FIG. 6, FIG. 7 and FIG. 8 are sectional views of FIG. 4 taken along lines 1—1, 2—2, 3—3 and 4—4, respectively. Referring to FIG. 5, snaps 13 and 15 extending from the periphery of face plate 10 are projected inwards. This is because outward projecting snaps would scratch the treated surface of the base plate edge strip 30 (FIG. 1) during installation or demounting. Referring to FIG. 7, the prying hole 17 along the short side of face plate 10 is provided to accommodate a screwdriver for demounting purpose. It is necessary to provide at least two prying holes on face plate 10 intended for covering two or more switches.

FIG. 9 is a sectional view of the snap-fit connection showing the snap bent from steel plate projected inwardly to interlock with the base plate;

Referring now to FIG. 10, raised housing surfaces 28 and 29 for mounting switch 40 are arranged not only to permit switch actuator 45 to extend through the front surface of face plate 10 at a correct height but also to accommodate a necessary length of snaps to adequately fix face plate 10 to base plate 20. For fabrication from steel plate, snaps extending from the periphery of face plate 10 need a minimum length for bending. The height of raised housing surfaces 28 and 29 at this preferred embodiment is about 4 mm. However, it is not always necessary to provide the housing surface of this height. A thinner decorative switch plate assembly of this invention with a thickness 3 mm or less from can be achieved by arranging the snap-fit engagement under the base plate but within a wall box.

Switch housing retainer strips 31, 32, 33 and 34 are provided to prevent misalignment of switch actuator 40. Some screws at threaded side having round slope end would move switch 40 from its original aligned position at final screwing stage to cause misalignment between orifice 11 and switch actuator 45. This is because conventional screw holes provided with switches are elongated laterally for positioning adjustment. However, round screw holes 26 and 27 for switch 40 with a dimension slightly larger than the diameter of screws 51 and 52 are good enough for the assembly of this invention because the assembly is an independent structure with the dimensions pre-arranged.

FIG. 11, FIG. 12, FIG. 13 and FIG. 14 are sectional views of base plate 20 shown in FIG. 10 taken along the lines 5—5, 6—6, 7—7 and 8—8, respectively. FIG. 13 shows the structure of the snap receiving notches 23 and 24.

Figure 15:
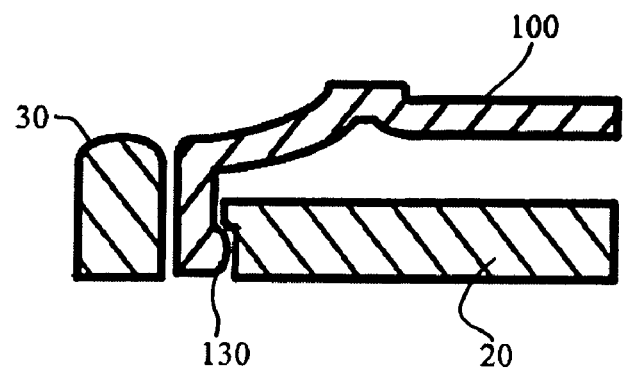
FIG. 15 is a sectional view of a snap-fit connection showing the molded snap inwardly projected to interlock with the base plate.

The face plate of the present invention can also be molded. FIG. 15 depicts the snap-fit engagement between base plate 20 and a molded face plate 100 with the snap projected inwards. The thickness of face plate 100 for molding is about 2.00 mm.

Figure 16:
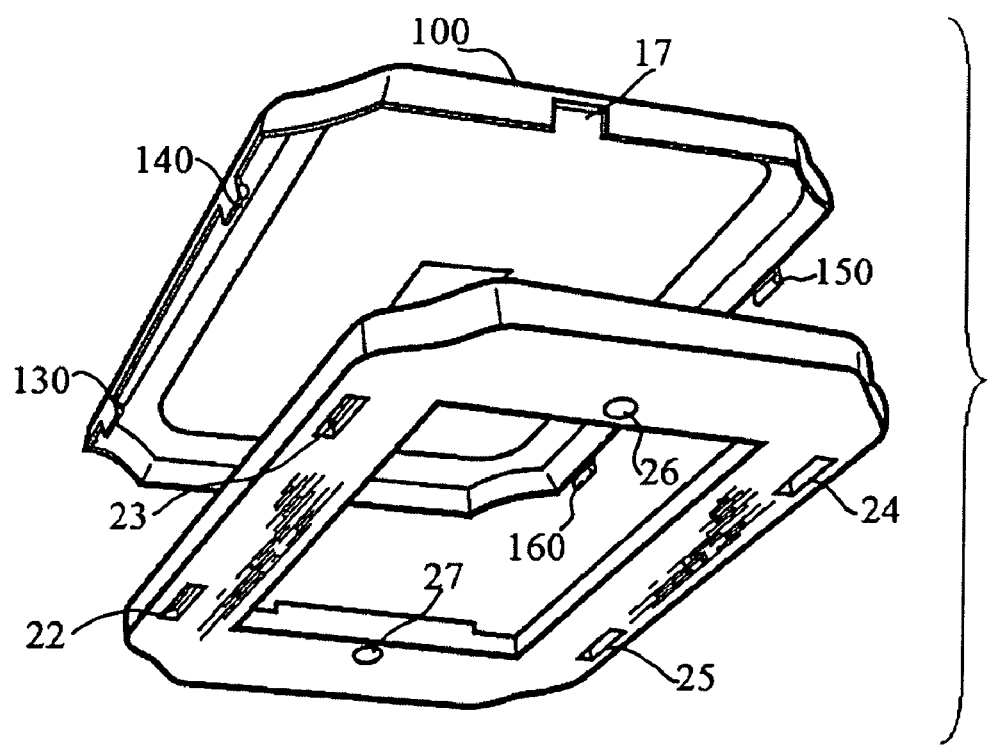
FIG. 16 is a perspective of a molded face plate and the base plate, showing the back side of the base plate and face plate including the molded snaps.

FIG. 16 is a perspective of a molded face plate and the base plate, showing the back side of the base plate and the face plate including the molded snaps 130, 140, 150 and 160.

Base plate 20 can receive either a molded face plate 100 or steel face plate 10 which provides a variety of decorative choices for assembly by coordinating the face plates and base plates in different colors or with different surface treatments.

Figure 17:
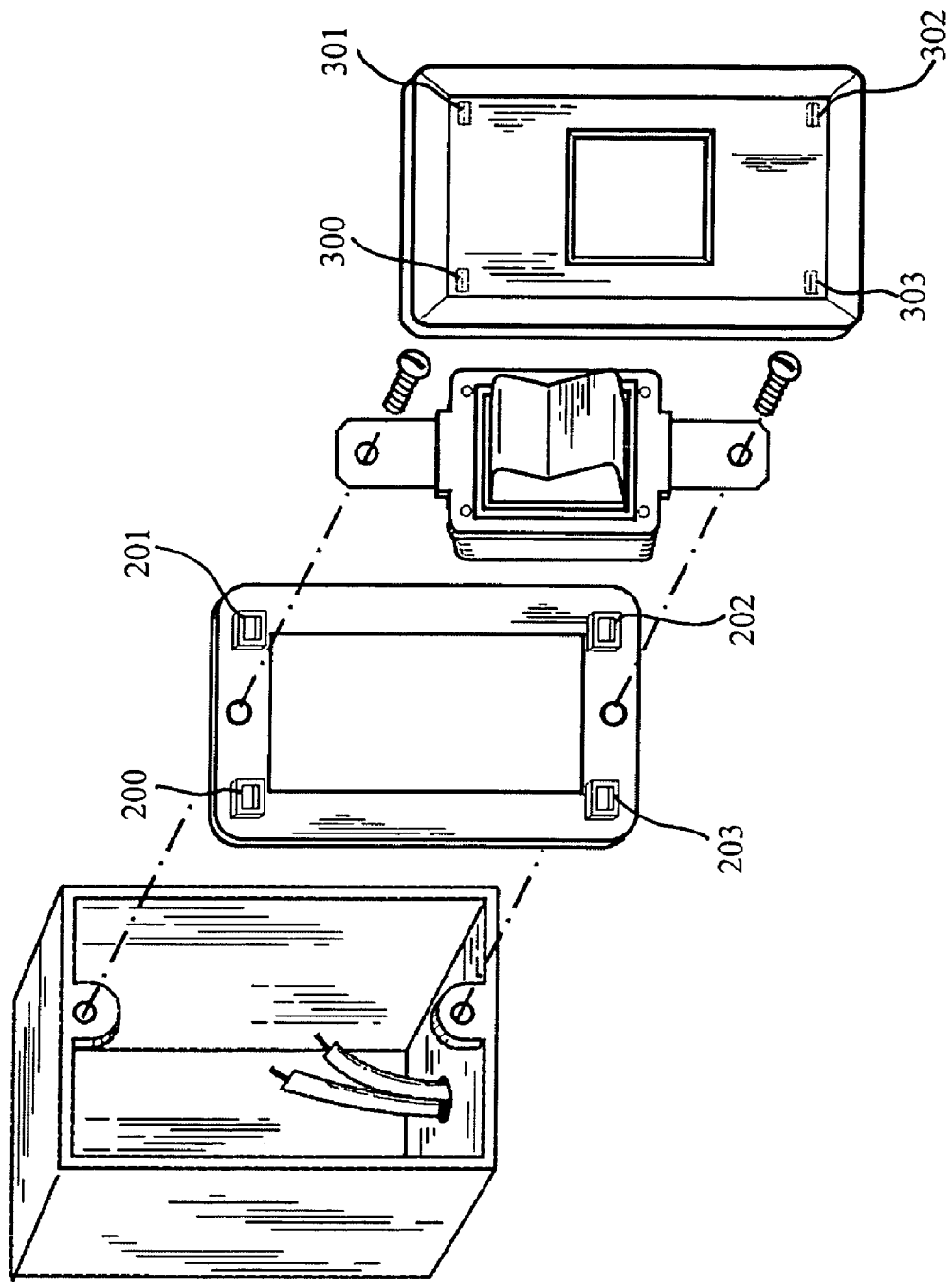
FIG. 17 is an exploded perspective view of an alternative embodiment of the present invention.
Figure 18:
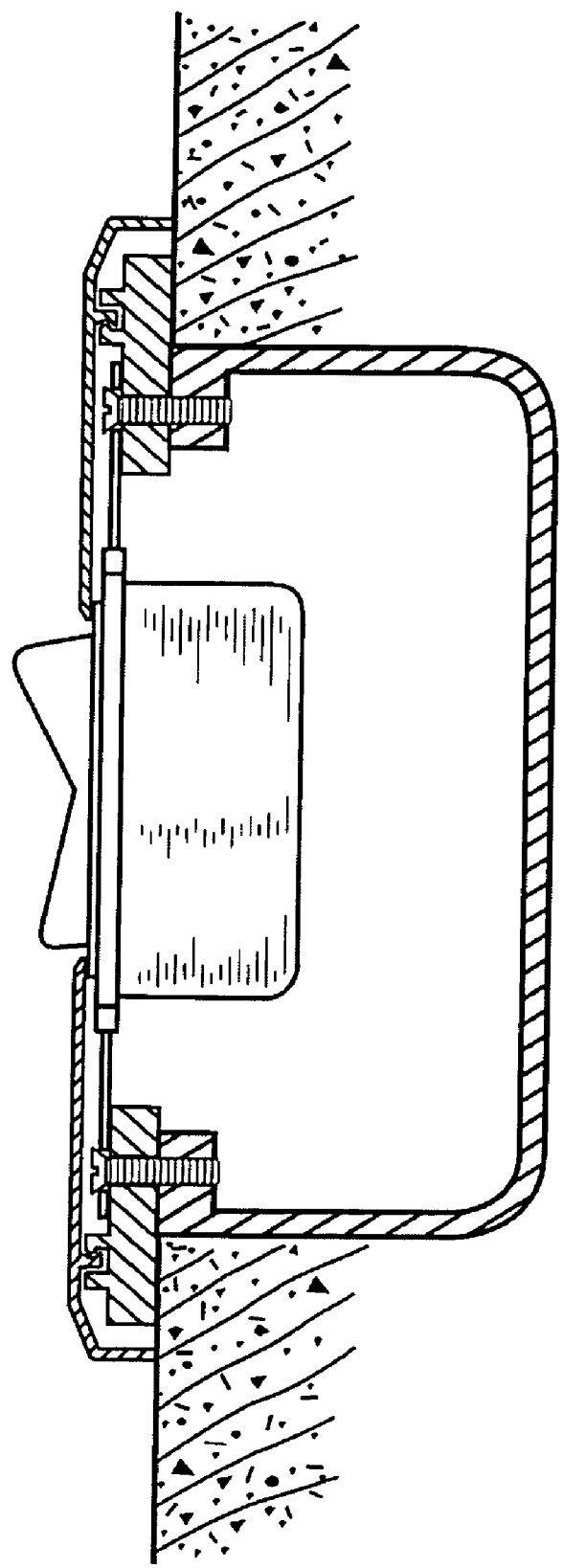
FIG. 18 is a sectional view of the alternative assembly showing the interrelations among the face plate, the base plate, the switch, the wall box, the molded snaps and the snap receiving notches.

Alternatively, this invention can also be modified so that the outer periphery of a base plate can be totally covered under a face plate with snaps and corresponding snap receiving notches aligned to each other and arranged at locations other than those locations used at this preferred embodiment. FIG. 17 and FIG. 18 show such an alternative assembly for a molded face plate and a molded base plate. Snaps 300, 301, 302 and 303 are extended from the back surface of a molded face plate and are aligned with corresponding snap receiving notches 200, 201, 202 and 203 at a molded base plate, respectively, for interlocking engagement. The present invention provides various ornamental designs of the switch plate assembly with special shapes for house decoration while still using the advantage of screwless front surfaces.

The principle of this invention may also be used for other decorative purposes such as for door lock covers, wall-mounted metal pictures or craft devices and desk decorative devices.

While certain preferred and alternative embodiments of the invention have been set forth for purposes of disclosure, modifications to the disclosed embodiments as well as other embodiments thereof may occurred to those skilled in the art. Accordingly, the appended claims are intended to cover all embodiments of the invention and modifications thereof which do not depart from the spirit and scope of the invention.

What is claimed is:

1. A screwless switch cover plate assembly comprising:
a base plate that comprises: a central opening adapted for receiving at least one switch; at least one pair of housing surfaces having screw holes for supporting said switch; an edge strip adapted to accommodate a face plate with its inner periphery slightly larger than the outer periphery of the face plate; a plurality of attachment meanings for attaching the face plate to the base plate wherein the attachment meanings are notches and are symmetrically located adjacent the edge strip; and
the face plate that comprises: at least one opening to permit each actuator or knob or socket of said switch to extend through said face plate to the base plate wherein the attaching meanings are snaps and are symmetrically located.

2. A switch plate assembly as described in claim 1 wherein snaps are aligned with the corresponding notches for interlocking engagement.

3. A switch plate assembly as described in claim 2 wherein said snaps are extending from the periphery of said face plate.

4. A switch plate assembly as described in claim 2 wherein said face plate has at least one hole along the short side adapted for a screwdriver head.

* * * * *